UNITED STATES PATENT OFFICE.

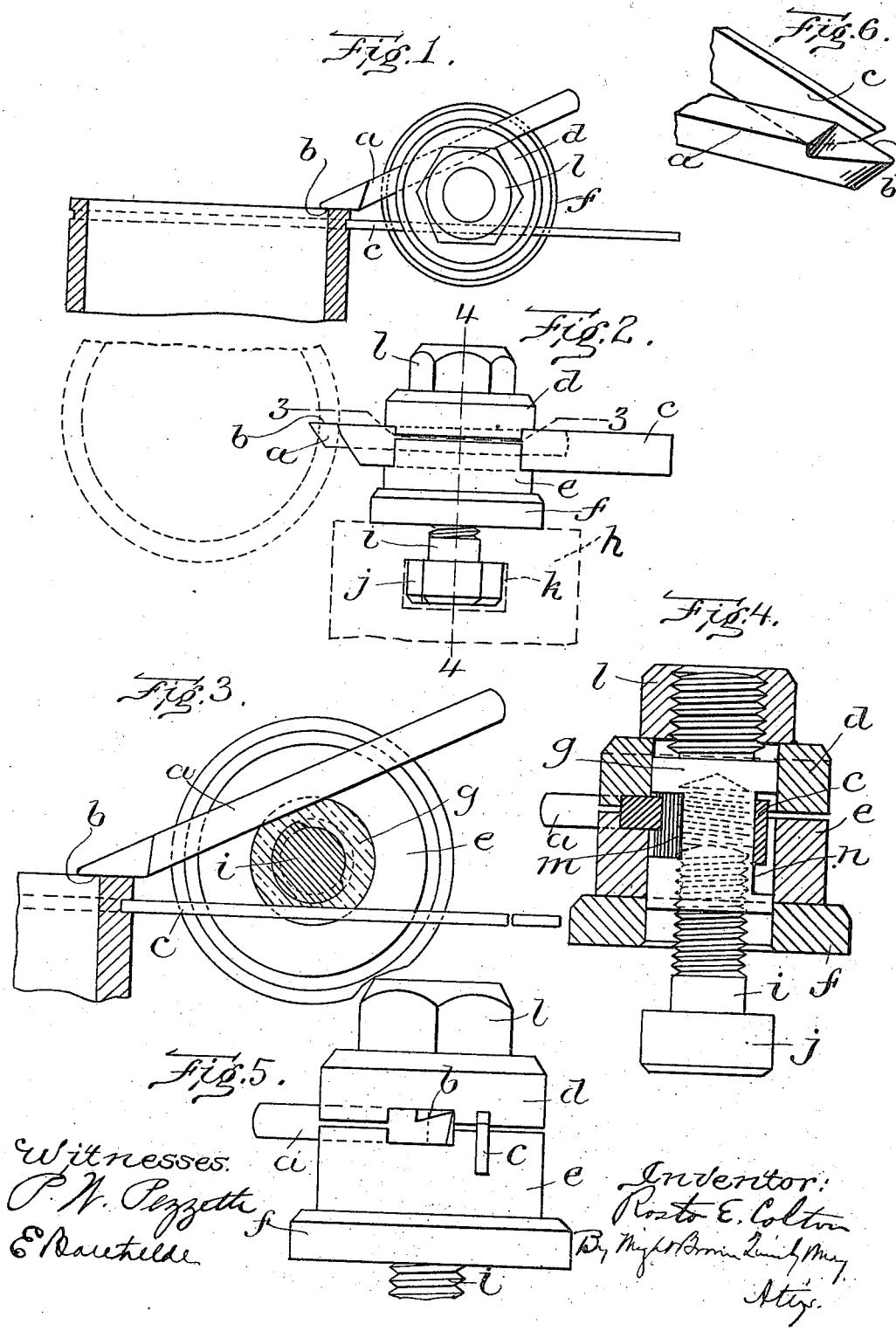

ROSTO E. COLTON, OF EASTHAMPTON, MASSACHUSETTS, ASSIGNOR TO COLTON COMBINATION TOOL COMPANY, OF CHESTER, VERMONT, A CORPORATION OF MAINE.

APPARATUS FOR CUTTING AND FACING ARTICLES.

1,063,184. Specification of Letters Patent. Patented June 3, 1913.

Application filed July 8, 1909. Serial No. 506,557.

*To all whom it may concern:*

Be it known that I, ROSTO E. COLTON, of Easthampton, in the county of Hampshire and State of Massachusetts, have invented certain new and useful Improvements in Apparatus for Cutting and Facing Articles, of which the following is a specification.

This invention relates to a novel mode of cutting rings, disks, washers or other articles from a piece of stock and at the same time truing or facing off one of the sides of the article thus cut and the object is to enable the facing and cutting of the article to be performed in one operation, whereby time may be economized in the manufacture of such articles, and to an apparatus for so cutting and facing the articles.

The invention has particular reference to the production of rings such as are used for packings of steam engine pistons, although it is capable of application to the production of other articles as well which require that the side or face thereof opposite to, that whereon it is severed from the body of the stock should be made true.

Briefly stated the invention consists in providing a grooving tool adapted to enter the stock in one of its surfaces and to provide a side or facing tool in such relation to the grooving tool that both tools may act simultaneously on the same piece of stock, and then giving the work and tools such relative motions of cutting travel and feed respectively that the grooving tool is caused to advance progressively into the work to separate a piece therefrom and at the same time the side tool is caused to face off the outer surface of the piece being separated.

In the accompanying drawings is illustrated an apparatus for carrying this invention into effect.

Figure 1 is a plan view of such an apparatus embodying the principles of the invention. Fig. 2 is a side elevation of same. Fig. 3 is a plan view of the parts of the apparatus below the line 3—3 of Fig. 2. Fig. 4 is a cross-section of the apparatus on the line 4—4 of Fig. 2. Fig. 5 is the front elevation. Fig. 6 is a perspective view of the tools employed in carrying this invention into effect, showing the relation which they usually occupy.

Describing first the construction of the embodiment of an apparatus for carrying this invention into effect which is shown in the foregoing figures, the letter $a$ represents a side tool having a cutting edge $b$ which is used for facing off that surface of the work which extends in the plane or line of relative travel between the work and tool. $c$ represents the cutting off tool for acting on the side of the work, forming a groove therein, which finally passes completely through the work and severs a piece therefrom. Both these tools are carried by a single holder consisting preferably of coöperating clamps $d$ and $e$, a base plate or pedestal $f$ on which the lower clamp $e$ rests and a central post $g$ passing through the base and clamps. It may be noted that the latter are preferably circular collars which are concentric with the axis of the post, although the form and proportions of the same are not material to this invention. The holder is supported upon the tool slide $h$ of the lathe or on the corresponding tool carrier of any other form of machine tool and is preferably secured thereto by the bolt $i$ having a head $j$ contained in an under-cut groove $k$ of the slide. The shank of the bolt is screwed into the threaded interior of the post and serves to bind the holder against the slide. The nut $l$ screwed upon the outer end of the post is employed for forcing the clamps $d$ and $e$ against the tools and clamping the holders on the slide $h$.

The tools $a$ and $c$ pass between the clamps $d$ and $e$ and are contained in grooves or channels formed partially in each clamp. These grooves confine the tools with a positive engagement, so that they cannot slip out of place. The grooves are inclined to one another so that the shanks and tools inserted therein converge toward each other at their cutting or operative ends. By reason of this angularity between the tools the distance between their cutting ends may be readily adjusted and varied by moving the tools as a whole endwise. When the tools are moved outward their cutting edges approach one another and when they are retracted their cutting parts separate. By these means the tools may be adjusted to act simultaneously upon work of any desired thickness. The tool channels in the clamps are located so that sufficient stock is left in the clamps outside of the channels to give the necessary amount of strength and rigidity for holding the tools. This necessitates locating the grooves on opposite sides of the center of the clamps and near enough to the center so that they intersect the post g. The latter is accordingly slabbed off or cut away at m and n to form recesses in alinement with the channels so that the straight shanks of the tools may lie properly therein. Preferably tools thus arranged relatively to one another are mounted upon the cross-feed slide of a lathe to act upon a cylindrical piece of stock which is rotated by the lathe. When the tool carriage is moved toward the axis of rotation of the stock, the tools act preferably on the end and side of the stock respectively to face the end and cut off the end portion. Preferably the side tool is set somewhat in advance of the cutting off tool so that it may finish the facing off of the work before the end thereof is severed from the body of the stock. The side tool also serves as a gage, since when it is set in position for operation the same setting locates the grooving tool where it will cut off a piece of a predetermined thickness. As both tools are mounted in the same holder they are fed simultaneously and perform their two functions in one operation; thus two operations are performed at one time on the same piece and the time factor of the expense of manufacture is thereby diminished.

I claim—

1. A means for cutting faced articles comprising a tool holder having coöperating clamping members provided with grooves or channels to contain cutting tools, and tools having their shanks contained in such grooves or channels, one of the tools having a cutting edge on its end and the other having a longitudinal cutting edge on the side adjacent to the first tool, and the grooves being inclined to one another and the tools placed therein in such manner that they converge toward the ends having the cutting edges.

2. A means for cutting faced articles comprising a tool holder having tool clamping members and provisions in said members for containing the shanks of cutting tools, and a plurality of tools having their shanks secured by and between said clamping members, one of said tools having a longitudinal cutting edge at its side, and the other of said tools having a cutting edge on its end and being located at the side of the first tool whereon said longitudinal edge is located, whereby the first tool is adapted to finish the end face of a piece of stock, and the second tool is adapted to enter the side of the stock and cut off the portion thereof of which the end face is finished by the first tool.

3. A tool holder comprising a post and a pair of clamping collars mounted on said post, said collars having channels in the faces thereof nearest to one another and on opposite sides of their axis to contain the shanks of cutting tools, the channels being at an angle to each other, so that movement of such shanks endwise therein may adjust the distance between the cutting edges of the tools, in combination with tools having their shanks contained in such grooves, one of said tools having a cutting edge on its end and the other having a cutting edge on the side adjacent to the first tool.

In testimony whereof I have affixed my signature, in presence of two witnesses.

ROSTO E. COLTON.

Witnesses:
 CHARLES G. BUTTERFIELD,
 TRANGOTT W. VETTERLING.